Patented Mar. 28, 1950

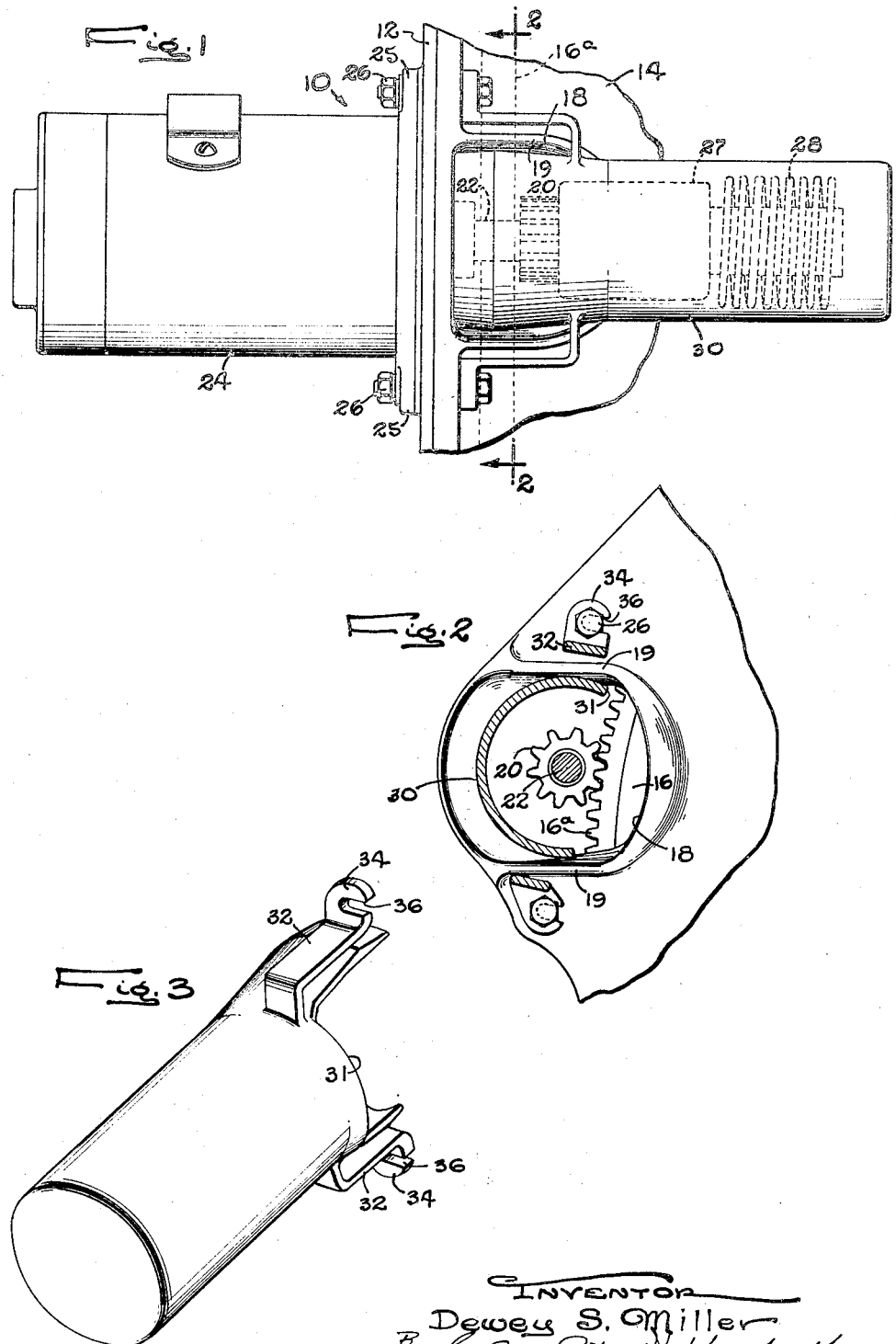

2,502,336

UNITED STATES PATENT OFFICE 2,502,336

ENCLOSURE DEVICE FOR AUTOMOBILE STARTING MECHANISMS

Dewey S. Miller, Albion, Nebr., assignor to Dewey S. Miller and Kenneth M. Miller, doing business as Miller Manufacturing Co., Albion, Nebr.

Application June 21, 1949, Serial No. 100,456

1 Claim. (Cl. 74—7)

The present invention relates generally to internal combustion engine assemblies and more particularly to enclosure devices for certain operating components of such assemblies.

In the operation of motor vehicles under adverse driving conditions as in inclement weather and on unimproved surfaces, exposed parts frequently become fouled with foreign material such as dust, dirt, water, mud and slush. While in general adequate protection is provided in the form of suitable housing and covering means for most of the operating components so that such fouling does not seriously interfere with the operation of the vehicle, in some makes of them the starting mechanism is exposed. An example of an automobile in which this condition exists is the Hudson.

When the starting mechanism has such foreign material disposed on it, and as a direct result thereof, its operation becomes either sluggish and noisy or it simply will not function at all. The latter is particularly true in winter. Since the mechanism is usually disposed adjacent the lower portion of the vehicle engine, it is relatively inaccessible and quite inconvenient for the operator to clear it. Accordingly, it is an object of the present invention to overcome the aforementioned difficulties through the provision of an enclosure device for a starting mechanism which is of exceedingly simple form, permits of quick and easy application without the necessity for modification of existing structure and which permits of economical manufacture.

Still another object is to provide support for an enclosure device of the aforesaid character which permits accommodation to minor surface irregularities of portions of the engine assembly adjacent which the device is placed and affording resistance to failure or breakage during installation and use.

The objects of the invention thus generally set forth together with other objects and ancillary advantages are attained by the construction and arrangement shown by way of illustration in the accompanying drawing, in which:

Figure 1 is a side elevation illustrating an enclosure device embodying the features of the present invention and in place relative to an automobile engine starting mechanism.

Fig. 2 is a transverse section taken substantially in the plane of line 2—2 in Fig. 1, but showing the starting mechanism pinion in engagement with the engine flywheel.

Fig. 3 is a perspective view of the enclosure device shown in the preceding figures.

Referring more particularly to the drawing, there fragmentarily illustrated is a starting mechanism generally designated 10 for a conventional internal combustion engine assembly of the type commonly used in automobiles. The latter has a mounting plate 12 rigid with the rear end thereof on which is supported a clutch housing 14. In addition to the clutch, which has not been illustrated in the instant drawing, the engine flywheel 16 is also disposed within the housing 14. The flywheel has rigid therewith and disposed about its periphery a ring gear 16a, and the housing 14 has an opening 18 therein through which a segment of the ring gear and flywheel projects. For purposes of additional strength, since the housing 14 is usually a casting, generally triangular ribs 19 are provided which are disposed along each side of the opening 18.

The starting mechanism 10 is constructed and arranged to coact with the flywheel 16 to rotate the latter for the purpose of initiating operation of the engine. The starting mechanism per se forms no part of the present invention so that a detailed description thereof is deemed unnecessary. Suffice it to say, it is of the well-known Bendix type, and it includes, as illustrated in phantom in Fig. 1, a pinion 20 supported on a shaft 22 which in turn is driven by a motor 24, means being provided to shift the pinion axially with respect to the shaft into and out of engagement with the flywheel ring gear 16a. The entire starting mechanism is supported on the mounting plate 12 by means of lugs 25 integrally formed with a portion of the casing of the motor 24, the mounting plate, the lugs and the adjacent portion of the housing 14 being suitably apertured for the reception of nut-and-bolt assemblies 26. It will be noted that the starting mechanism lies outside the housing 14, with the motor shaft 22, the pinion 20 and the shifting means for the pinion disposed adjacent the housing opening 18.

The means provided to shift the pinion 20 includes an internally threaded and weighted sleeve 27 telescoped over the shaft 22. The pinion 20 is supported on one end of the sleeve 27 and a shock-cushioning driving spring 28 is utilized to interconnect the other end of the sleeve 27 and the outer end of the motor shaft 22. Briefly, the operation of the mechanism 10 is such that upon actuation of the motor 24, the sleeve 27 carrying with it the pinion 20 is moved toward the left as viewed in Fig. 1, thus shifting the pinion into mesh with the projecting flywheel ring gear segment. When engine operation begins the sleeve 27 is moved toward the right carrying the pinion 20 out of engagement with the ring gear. It will be readily appreciated that the deposit of foreign material on these elements of the starting mechanism produces the fouling and the attendant operating difficulties.

In carrying out the present invention, means is provided to enclose the ordinarily exposed components of the starting mechanism 10 which include the pinion 20, the shaft 22 and the assembly operative to shift the pinion into and out of engagement with the flywheel ring gear, in order to prevent deposit of foreign material thereon. In its exemplary form, this means includes an elongated body 30 of tubular form having an open end and a closed end, and which is adapted to be simply telescoped over the components of the starting mechanism enumerated above and to be supported on the bolts 26, thus permitting its installation with absolutely no necessity for modification of existing structure of the engine assembly.

As shown, the body 30 is generally cup-shaped and is preferably formed as an aluminum casting. Its outer end is closed, and adjacent its opposite end the body is outwardly flared for engagement with the surface of the housing 14 bordering the opening 18 therein. Immediately adjacent its inner end, the body wall is tapered toward a comparatively thin edge. On one side, a portion of the body wall is scalloped out forming a deep notch 31 so as to clear the pinion 20 and the projecting flywheel segment with which the pinion engages.

To support the device in place on the engine assembly, a pair of generally L-shaped legs 32 are utilized which are made rigid with the body 30 intermediate its ends and extend longitudinally in spaced relation thereto toward its open end. The ends of the legs 32 terminate in feet 34 which project outwardly with respect to the legs in a direction substantially parallel to the mounting surface. The feet are suitably apertured for the reception of the bolts 26. Preferably, such apertures are in the form of slots 36.

Upon installation of the enclosure device, the strengthening ribs 19 of the housing 14 are received in the space between the legs 32 and the body 30 thereby permitting the inner end of the device to abut the transverse surface of the housing 14 subtending the bottom of the opening 18 as well as permitting the longitudinal portion of the body wall about the notch 31 to engage the remainder of the housing surface bordering the opening 18 without the necessity of alteration of rib shape.

From the foregoing, therefore, it will be apparent that the instant device permits of ready accommodation to minor irregularities in the surface of the housing 14, thus eliminating any necessity for removing such irregularities. The construction of the feet apertures in the form of slots permits lateral alteration of position of the device. The formation of the device as a casting of such relatively soft material as aluminum and the tapering of its inner edge permit the edge to be easily conformed to the surface of the housing against which it abuts so that upon tightening of the bolts 26 the edge is drawn down tight against the hard cast surface of the housing 14.

The elongated form of the legs 32 provides some flexibility, and the joining thereof at points spaced from the edges of the body provides a juncture completely surrounded by the material of the body. Thus it can be seen that danger of breakage or failure during installation and use is minimized.

The flywheel ring gear 16a and the pinion 20 are normally not lubricated and as a result there is considerable noise resulting as an incident to their operation in conjunction with each other upon starting the engine. This noise becomes more pronounced with the deposit of foreign material on the parts of the starting mechanism. Thus, the enclosure device serves the additional purpose of muffling the noise normally incident to operation, and by preventing the deposit of foreign material such noise is kept at a minimum.

I claim:

An enclosure device for the starting mechanism of an internal combustion engine assembly including a flywheel together with a housing disposed about the flywheel and having an opening therein through which a segment of said flywheel projects for engagement by the starting mechanism, said device comprising a generally cup-shaped body having a notch extending longitudinally in the wall thereof from its open end and a pair of L-shaped legs rigid with the body intermediate its ends and extending longitudinally of the body in spaced relation thereto, the free ends of said legs terminating in outwardly projecting feet having apertures therein for the reception of bolts to secure the device on said housing with the free edges of the body wall in engagement with the surface of the housing bordering the opening therein.

DEWEY S. MILLER.

No references cited.